United States Patent [19]

Bates

[11] 4,087,914
[45] May 9, 1978

[54] GUIDE ASSEMBLY FOR PORTABLE SAWS

[76] Inventor: Arthur Edward Bates, 15481 Marine Drive, White Rock, British Columbia, Canada, V4B 1C9

[21] Appl. No.: 798,803

[22] Filed: May 20, 1977

[51] Int. Cl.² .............................................. B27B 9/04
[52] U.S. Cl. ..................................................... 30/374
[58] Field of Search ................. 30/273, 373, 374, 375, 30/376, 388

[56] References Cited
U.S. PATENT DOCUMENTS

| 1,753,959 | 4/1930 | Wikstrom | 30/374 |
| 2,728,141 | 12/1955 | Green | 30/273 |
| 3,839,789 | 10/1974 | Valkosky | 30/374 |

Primary Examiner—Jimmy C. Peters
Attorney, Agent, or Firm—Carver and Company

[57] ABSTRACT

A guide for enabling straight-line tracking of a hand-held portable power saw over a work-piece having a clamp adapted to be secured at the forward edge of the sole plate of the saw, the clamp having at least one roller mounted thereon providing roller support for the saw on the work-piece, the roller having axially spaced apart work-piece engaging sections so as to inhibit angular deviation of the saw as it is moved over the work-piece.

6 Claims, 4 Drawing Figures

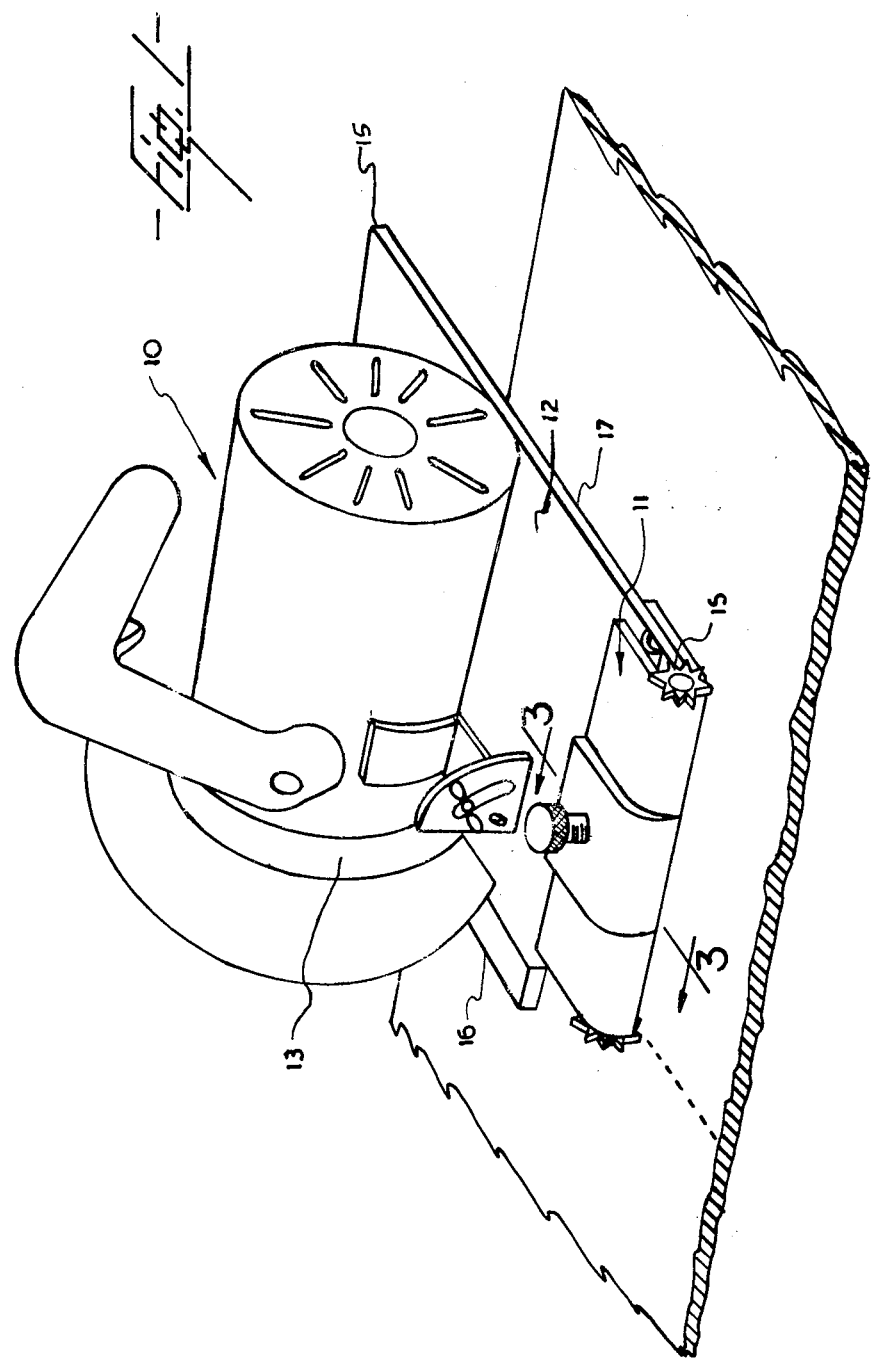

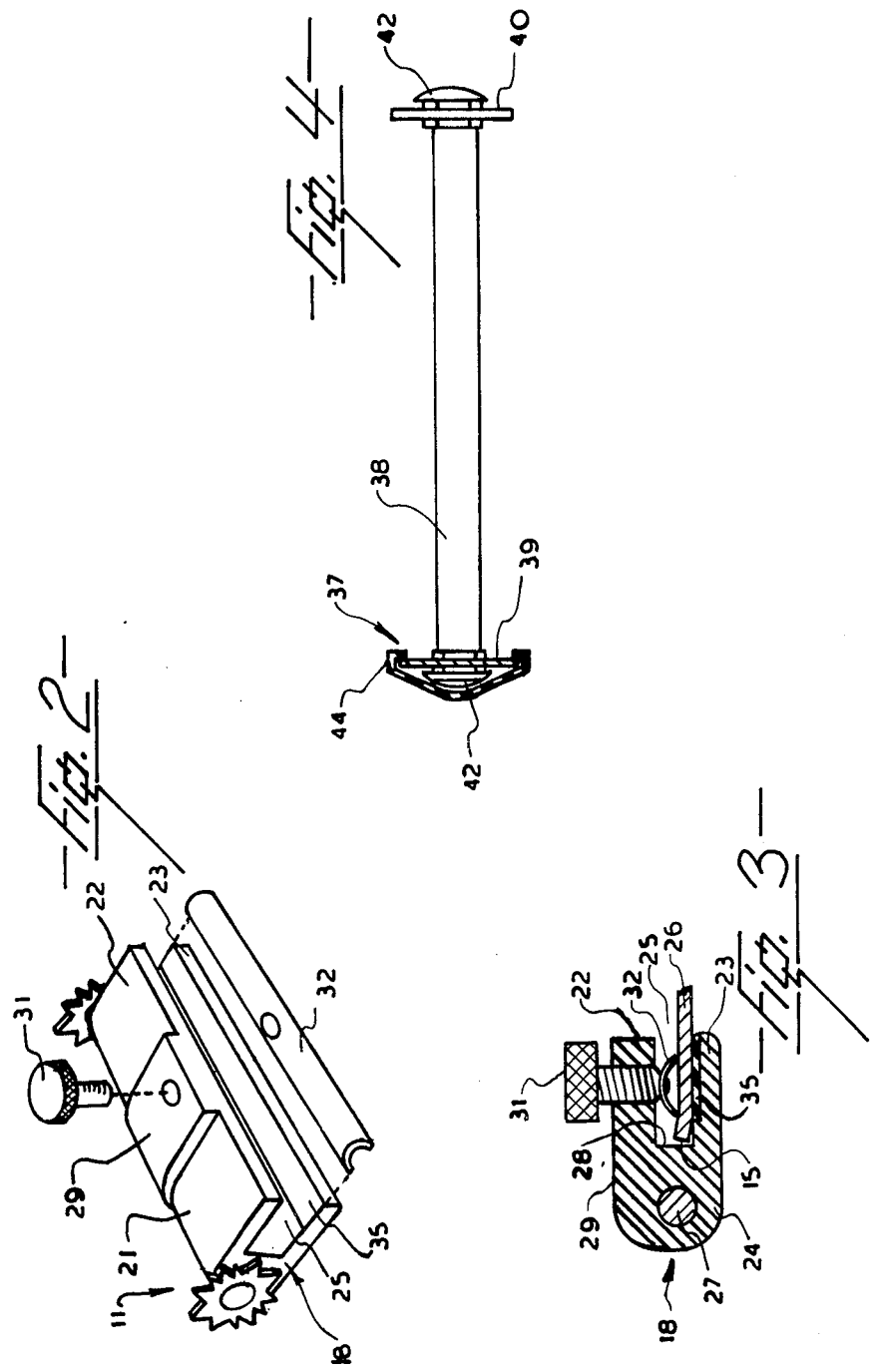

GUIDE ASSEMBLY FOR PORTABLE SAWS

BACKGROUND OF THE INVENTION

1. Field of the Invention

This invention relates to guide attachments for hand-held power wood cutting tools, particularly saws having circular blades.

One of the disadvantages of power hand saws, particularly circular saws and the like, is the difficulty of following a perfectly straight line across large workpieces such as sheet plywood and the like. Due to the tendency of the saw to wander or otherwise angularly deviate from a straight line, corrective force must be applied which results in kick-backs and the like, a common cause of accidents.

Edge guided attachments have been devised for saws, however, if the line to be followed is a considerable distance from the edge of the sheet of plywood, or if the edge of the board is not straight, or if the line to be followed is biased relative to the edge of the sheet of plywood, such guide attachments which use the edge of the sheet of plywood as a guide edge are of no use. It is, of course, possible to clamp a straight edge across the work-piece to act as a saw guide, however, this is a time consuming practice and requires careful measurement to ensure that the straight-edge is correctly positioned so that when engaged with the sole plate of the saw, the saw blade follows a straight line.

SUMMARY OF THE INVENTION

The present invention provides a guide attachment for a power hand-saw which is easily secured to, or removed from, a power hand-saw and which can guide the saw in a straight line across a work-piece at any angle to the side edge thereof and therefore avoids the disadvantages of known guides which provide guidance along lines parallel to the side edges of the work-piece.

The guide of the present invention is, furthermore, relatively inexpensive to manufacture and can fit substantially all makes of saws. Furthermore, it is relatively small and poses, therefore, no storage problems and is not likely to be mislaid, or the like, as it can be secured to the saw when the latter is not in use.

The guide of the present invention comprises a clamp adapted to be mounted at the forward edge of the sole plate of the saw, a roller mounted on the clamp for rotation about an axis perpendicular to the line of travel of the saw and projecting below the sole plate for contacting the work-piece, the roller having axially spaced apart portions adapted to grip the work-piece for resisting angular deviation of the saw as it is moved across the work-piece.

A detailed description following, related to the drawings, gives exemplification of apparatus according to the invention which, however, is capable of expression in means other than those particularly described and illustrated.

DESCRIPTION OF THE DRAWINGS

FIG. 1 is an isometric view of an electric hand-saw with the guide attachment of the invention secured thereon, FIG. 2 is an isometric view of the attachment partially exploded, FIG. 3 is a section taken on Line 3—3 of FIG. 1, FIG. 4 is a longitudinal view of a roller partially sectioned.

DETAILED DESCRIPTION

Referring to the drawings, FIG. 1 shows a conventional electric circular hand-saw 10 with a guide attachment 11 secured thereon. The hand-saw 10 has a substantially rectangular sole plate 12 through which the saw blade 13 projects. The sole plate has front and back edges 14 and 15 which are perpendicular or transverse to the direction of movement when cutting and side edges 16 and 17 which extend parallel to the direction of movement when cutting.

Referring also to FIGS. 2, 3 and 4, the attachment 11 includes a clamp 18 which has an elongated "U" shaped bracket 21 having spaced upper and lower legs 22 and 23, respectively, and a substantially thick base section 24. The spaced legs provide a slot 25 for receiving the forward edge portion 26 of the sole plate 12 of the saw. The base section has a longitudinally extending cylindrical bore 27 which extends parallel to the bottom 28 of the slot. The upper leg 22, which has a thickened central section 29, is tapped to threadedly receive a set screw 31 which can be extended into the slot against a curved spring steel shoe 33 which fits in the slot over the front end portion 26 of the sole plate. The lower leg of the bracket has a rubber strip 35 adhered thereto against which the sole plate is pressed when the set screw is tightened to provide a substantially nonslip grip of the bracket on the sole plate.

The bracket supports (see FIG. 4) a roller assembly 37. The roller assembly has a cylindrical shaft 38 rotatably mounted in the bore 27. Spurred discs or rowels 39 and 40 are non-rotatably mounted at opposite ends of the shaft being secured thereon by speed nuts 42-42. End portions of the shaft are shaped to mate with center openings of the rowels to provide a non-rotative connection so as to ensure that the rowels are mutually rotatable with the shaft.

In attaching the guide attachment to the saw, the bracket is fitted over the forward edge of the saw sole plate with the forward edge of the sole plate butting against the bottom of the slot and with the rowel 39 aligned with the saw blade. The set screw is then tightened down against the shoe 33 thus securing the attachment against movement and ensuring that the axis of the roller extends perpendicularly to the proposed line of travel of the saw.

In using the saw to cut a sheet of plywood the saw is positioned in alignment with the rowel 39 on the marked cut line and the cut is then started. If sufficient care has been taken to properly align the saw, the saw with ordinary care will follow the marked line as, due to the grip obtained by the rowels on the plywood sheet, angular deviation of the saw relative to the marked line and side-to-side movement will be inhibited so that the saw automatically follows the marked line with, possibly, only minor correction from time to time. The rowels, it will be appreciated, provide substantially non-slip engagement with soft woods, however, in cutting sheets of material which have a hard smooth finish, such as laminated plastic sheets, the rolls which depend upon penetration for their grip can be covered with a soft plastic or rubber cap 44, as shown in FIG. 4, to provide a frictional grip.

Although only one form of roller is shown and described, it is evident that other forms of rollers can be used, the contact surfaces of which are so designed or fabricated to provide substantially non-slip grip on the work-piece.

I claim:
1. A guide assembly for attachment to a sole plate of a powered hand-saw comprising:
    (a) an elongated roller having axially spaced apart mutually rotatable end portions,
    (b) means for securing the roller at the forward end of and extending transversely to the saw sole plate and with the said end portions projecting below the sole plate,
    (c) said end portions of the outer roller being adapted to grip the surface of the work piece so as to inhibit angular deviation of the saw as it is moved over the work-piece.

2. A guide assembly as claimed in claim 1 in which said end portions of the roller are peripherally toothed discs.

3. A guide assembly as claimed in claim 2 including caps formed of a rubber-like material adapted to be removably secured to the periphery of the discs for providing frictional engagement with the work-piece.

4. A guide assembly for attachment to a sole plate of a powered hand-saw comprising:
    (a) an elongated "U" shaped clamp having a thickened base section adapted to be removably secured to and extending transversely across the forward end of the sole plate,
    (b) the base portion of the clamp having a longitudinally extending bore,
    (c) a cylindrical shaft rotatably fitting in the bore and projecting from opposite ends thereof,
    (d) rollers secured at opposite ends of the shaft for mutual rotation therewith and projecting below the sole plate for engagement with a work-piece,
    (e) the rollers having peripheries adapted for gripping the surface of the work-piece so as to inhibit angular deviation of the saw as it is moved over the work-piece.

5. A guide assembly as claimed in claim 4 in which the rollers are peripherally-pointed discs.

6. A guide assembly as claimed in claim 5 including caps formed of a rubber-like material adapted to be fitted over the peripherally-pointed discs for providing frictional engagement with the work-piece.

* * * * *